United States Patent
Yurgevich

(12) 
(10) Patent No.: US 6,478,324 B1
(45) Date of Patent: Nov. 12, 2002

(54) VARIABLE HEIGHT GOOSENECK

(75) Inventor: Howard J. Yurgevich, Chula Vista, CA (US)

(73) Assignee: Hyundai Precision America, Inc., San Diego, CA (US)

( * ) Notice: Subject to any disclaimer, the term of this patent is extended or adjusted under 35 U.S.C. 154(b) by 0 days.

(21) Appl. No.: 09/689,003

(22) Filed: Oct. 12, 2000

(51) Int. Cl.$^7$ ................................................ B62D 21/09
(52) U.S. Cl. ................ 280/441.2; 280/425.2; 410/94
(58) Field of Search ............. 280/441.2, 490.1, 280/425.2; 410/87, 88, 94; 296/35.3

(56) References Cited

U.S. PATENT DOCUMENTS

| 3,752,502 A | * | 8/1973 | Ehler |
| 4,806,065 A | * | 2/1989 | Holt et al. |
| 5,017,066 A | * | 5/1991 | Tylisz et al. |
| 5,398,956 A |   | 3/1995 | Yurgevich |
| 5,456,485 A |   | 10/1995 | Yurgevich |
| 5,794,960 A |   | 8/1998 | Sill et al. |

FOREIGN PATENT DOCUMENTS

WO        81/01987        *  7/1981

* cited by examiner

*Primary Examiner*—Kevin Hurley
(74) *Attorney, Agent, or Firm*—Luce, Forward, Hamilton & Scripps LLP

(57) ABSTRACT

An adjustable chassis for transporting shipping containers of different configurations. The chassis comprises at least two spaced-apart frame members, with each frame member including an upper surface for supporting a shipping container. At least two conversion members are pivotally coupled to the chassis by at least two translation members. The conversion members are configured to translate from a storage position between the frame members to a deployed position resting on the upper surface of the frame members.

25 Claims, 4 Drawing Sheets

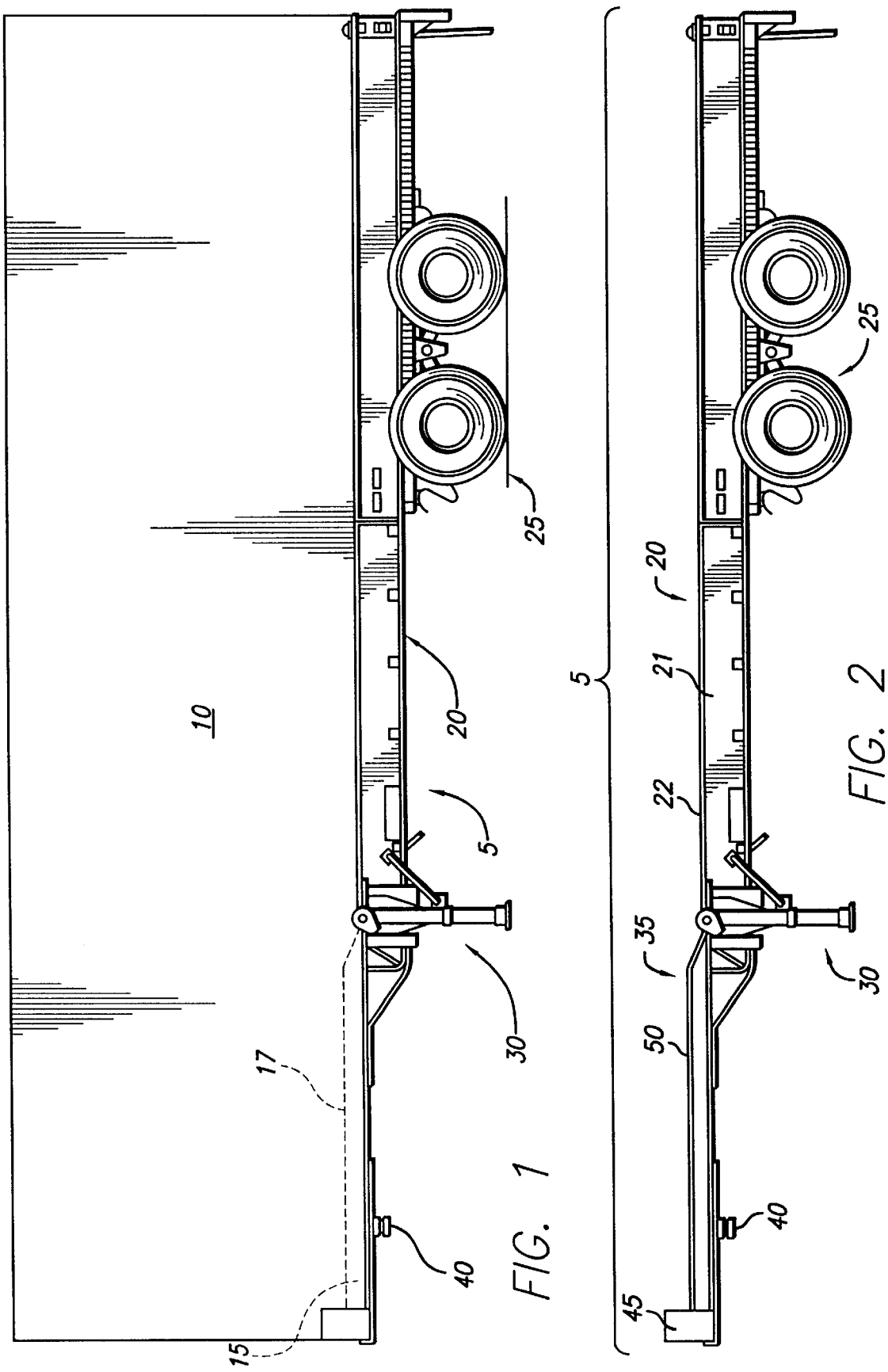

VARIABLE HEIGHT GOOSENECK

FIELD OF THE INVENTION

The field of the present invention relates to skeleton frame chassis used for overland transport of shipping containers. More particularly, the present invention relates to an adjustable chassis used to transport shipping containers having different configurations.

BACKGROUND OF THE INVENTION

Shipping or freight containers are often used for transporting goods by ship, rail and overland trucking. These containers are constructed in several different sizes and configurations often according to international standards. For overland trucking, the container is positioned on a chassis, with the chassis coupled to a tractor, truck, or other suitable towing vehicle. Generally the chassis couples to a fifth-wheel on the tractor. To accommodate overland trucking by chassis, most shipping containers have a tunnel located in a front bottom portion of the container. The tunnel is designed to extend over a forward section of the chassis. This forward section is generally referred to as the gooseneck section. The chassis gooseneck section is generally higher than the chassis rear portion because the kingpin that attaches the chassis to the tractor fifth wheel is located under the gooseneck. The container tunnel is designed to accommodate the higher gooseneck section so that the overall height of the container, as measured from the ground to the top of the container, stays within Federal highway transportation standards.

Today, there are generally two types of shipping containers in widespread use. The "standard" shipping container has a tunnel depth of about 4 ¾ inches and a more recent design, sometimes referred to as a "High-Cube" container, has a shallower tunnel depth of about 3 ¼ inches. The High-Cube container has a greater storage area than the standard container, permitting transportation of more goods. However, a High-Cube container placed on a chassis designed to fit a standard container will exceed Federal transportation height standards, because the top of the container is now about 1 ½ inches higher than allowed. This has forced transport companies to purchase and operate two different chassis, one configured for High-Cube containers and a second chassis configured for standard containers.

Variable, or convertible chassis have been developed in an effort to avoid the substantial logistical and financial expenditures associated with matching specific freight containers to specific chassis. These convertible chassis generally have variable height gooseneck supports made of moveable sections that can be configured to accommodate either type of container. However, these variable chassis have several shortcomings. For example, the conversion procedure necessary to covert the chassis from one configuration to the other requires the use of tools and considerable human effort, decreasing transportation efficiency and causing operator injuries. Because the moveable sections of the chassis are difficult to adjust from one configuration to another, operators sometimes transport a container with the chassis configured for a different type of container, resulting in a dangerous operating condition.

Another disadvantage is the moveable sections of the chassis do not extend along the entire length of the gooseneck. This adds stress to the container because only parts of the tunnel floor are supported by the gooseneck rails, causing deformation of the floor and subsequent fatigue failure of over-stressed containers. Full-length supports are not employed for a number of reasons, including the complexity of packaging the supports within the gooseneck, and the difficulty of designing a system that can easily rearrange full-length supports from one configuration to the other. This adds stress to the container because only parts of the tunnel are supported by the gooseneck rails, causing deformation of the container floor and subsequent fatigue failure of over-stressed containers.

Therefore, there exists a need for a variable height gooseneck chassis that can safely and efficiently accommodate containers having different tunnel heights.

SUMMARY OF THE INVENTION

In order to overcome the deficiencies with known, conventional shipping containers, a convertible chassis is provided. Briefly, the convertible chassis includes translation members coupled to the chassis that cooperate with conversion members. The conversion members are configured to be shifted by the translation members between a stored portion and a deployed position.

More specifically, one embodiment of the convertible chassis invention employs pivoting conversion members that are also pivotally coupled to the chassis. The conversion members are configured to be easily shiftable from a storage position between the chassis gooseneck frame members to a deployed position proximate to the chassis gooseneck frame members.

The convertible chassis of the present invention affords its users with a number of distinct advantages. First, unlike prior adjustable gooseneck chassis, the adjustable support sections of the present invention extend substantially along the entire length of the gooseneck frame members, thereby supporting the container tunnel floor. In addition, adjustment of the chassis from a High-Cube container configuration to a standard container configuration can be quickly accomplished by hand, without the use of any tools. Further, a disclosed embodiment of the present invention can be installed on existing High-Cube chassis, removing the need to operate and maintain specific chassis for specific freight containers.

BRIEF DESCRIPTION OF THE DRAWINGS

The nature, goals, and advantages of the invention will become more apparent to those skilled in the art after considering the following detailed description when read in connection with the accompanying drawings in which like reference numerals identify like elements throughout and wherein:

FIG. 1 is a side elevation view of a freight container mounted on a chassis employing features of the present invention;

FIG. 2 is a side elevation view of the chassis illustrated in FIG. 1;

Figure 3:
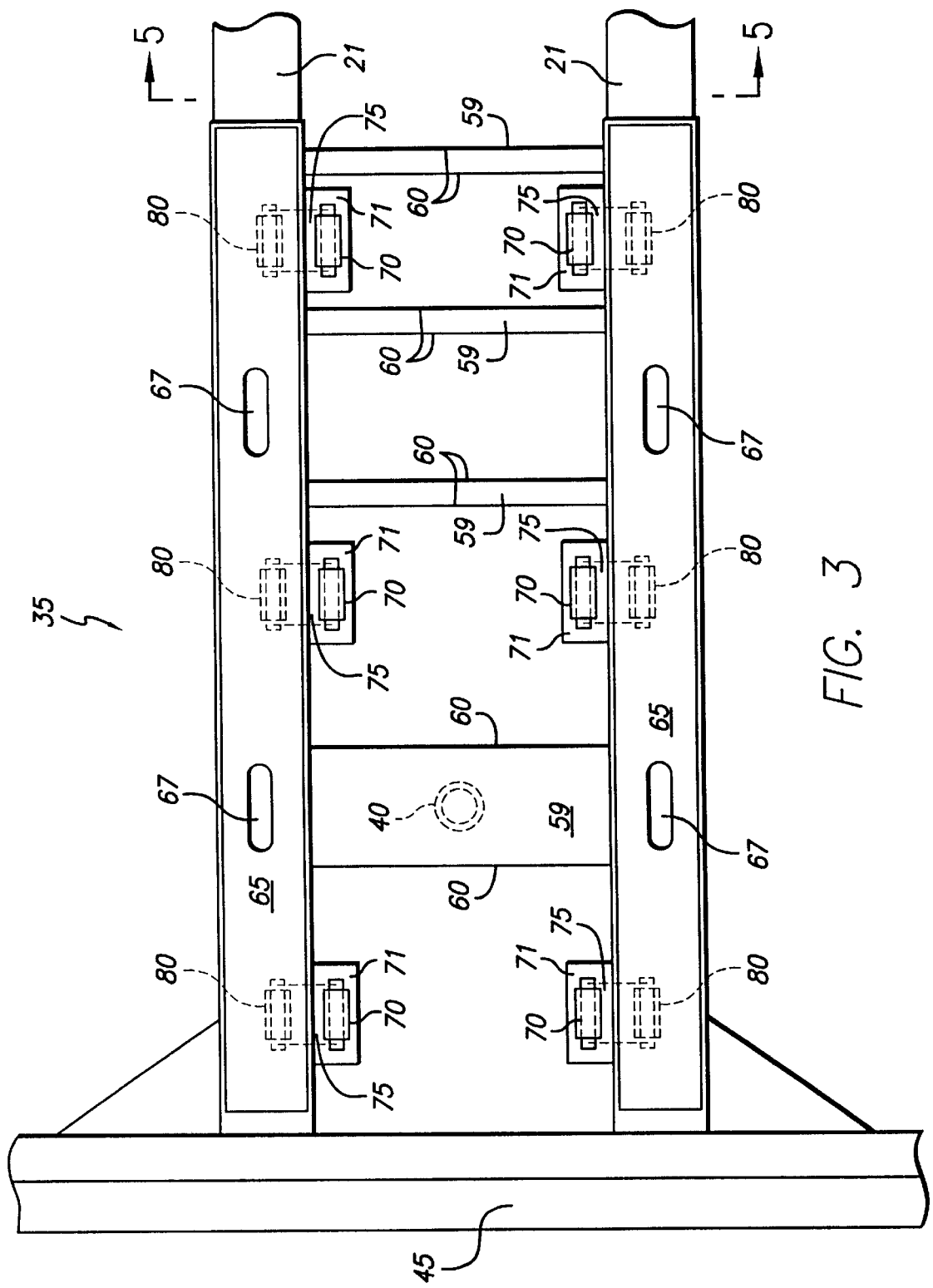
FIG. 3 is a plan view of the gooseneck section of the chassis illustrated in FIG. 2, with the tunnel converters of the present invention depicted in a deployed position.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention.

Referring to FIGS. 1 and 2, a chassis 5 with a removable shipping or freight container 10 positioned thereon is illustrated. The chassis 5 comprises a rear frame assembly 20 that includes a conventional wheel assembly 25, and a conventional strut assembly 30 positioned forward of the rear frame assembly 20. The chassis 5 also has conventional locking devices (not shown) for securing the container 10 onto the chassis 5. It will be appreciated that several different types of shipping containers can be coupled to the chassis 5, such as "High-Cube" or "standard" containers.

Illustrated in FIG. 1, the container 10 includes a recessed tunnel section 15 located on the front lower portion of the container 10 and extending rearward from the front of the container 10. The tunnel section 15 has a tunnel floor 17. The tunnel section 15 has a depth of about 3 ¼ inches for a High-Cube container and a depth of about 4 ¾ inches for a standard container. It will be appreciated that the container 10 can also have tunnel depths other than the standard or High-Cube tunnel depths.

Figure 4:
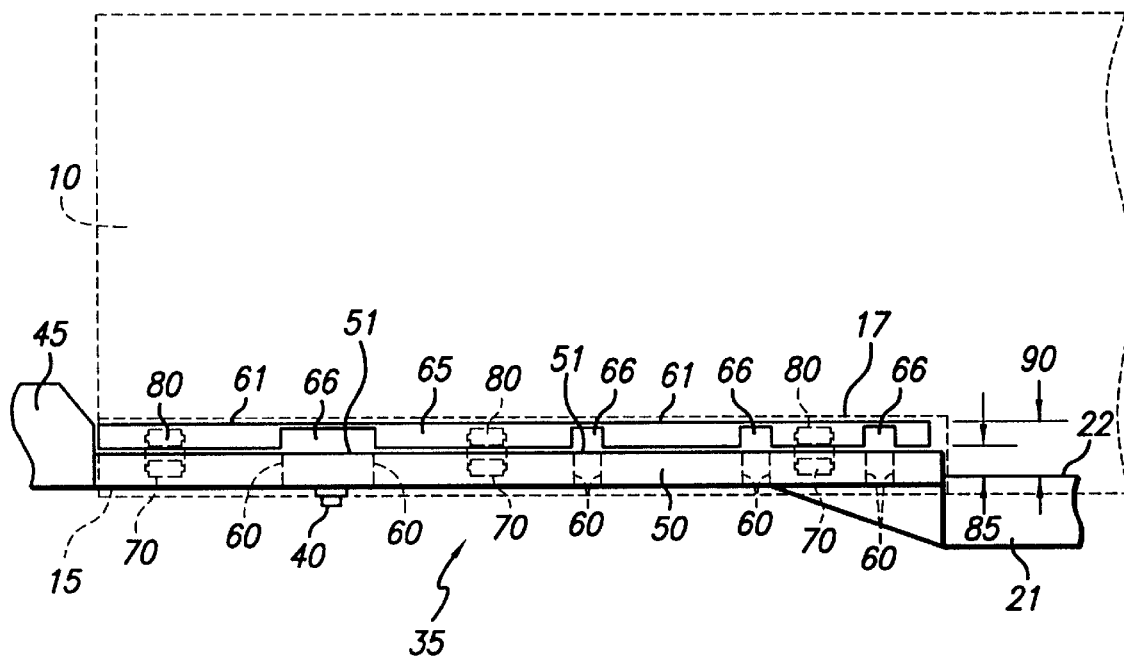
FIG. 4 is a side elevation view of the gooseneck section illustrated in FIG. 3, with the tunnel converters of the present invention depicted in a deployed position.

Shown in FIG. 4, the tunnel floor 17 of the tunnel section 15 of the container 10 engages a gooseneck assembly 35 that is connected to the rear chassis assembly 20. The gooseneck assembly 35 is raised relative to the rear chassis frame members 21 to accommodate the kingpin 40 that couples to a tractor fifth wheel (not shown). The container tunnel section 15 fits over the raised gooseneck assembly 35, keeping the height of the container 10, measured from the ground, within Federal transportation standards.

Referring to FIGS. 3 and 4, the gooseneck assembly 35 comprises two main gooseneck frame or beam members 50. It will be appreciated that the gooseneck frame members 50 can have a tubular, I-beam, or other suitable configuration. The gooseneck frame members 50 are joined to the rear frame members 21 and to the front bolster 45. Cross-braces 59 attach the gooseneck frame members 50 to each other and include substantially vertical webs 60. In one embodiment of the present invention, the kingpin 40 is attached to a cross-brace. It will be appreciated that the kingpin 40 may be attached to the chassis by other suitable methods. The gooseneck frame members 50 have an upper surface 51 that supports the container tunnel floor 17 when the container 10 is positioned on the chassis 5.

Referring to FIGS. 3–6, tunnel converters 65 are movably positionable in the gooseneck assembly 35. Accordingly the tunnel converters 65 may be positioned in a deployed position 95 on the gooseneck beams 50, or in a storage position 99 between the gooseneck beams 50. The tunnel converters 65 are pivotally mounted to the frame members 50 by pivot blocks 70 and tunnel converter pivots 80. The pivot blocks 70 can be directly attached to the gooseneck beams 50, or they can be mounted on pivot block support plates 71. It will be appreciated that alternative embodiments of the invention can mount the pivot blocks 70 on the cross braces 59, or on other suitable surfaces. The pivot blocks 70 and tunnel converter pivots 80 can use roller bearings, tapered roller bearings, bushings or other suitable rotation elements. It will be apparent that other rotational elements may be used. For example, the rotational element may be sealed roller bearings 72. Alternatively, the pivot blocks 70 and tunnel converter 65 may be configured to pivot by using a pin and tube arrangement, similar to door hinges. Another embodiments may employ nylon, brass or other types of suitable bushings to minimize pivot resistance and hinge wear.

Figure 7:
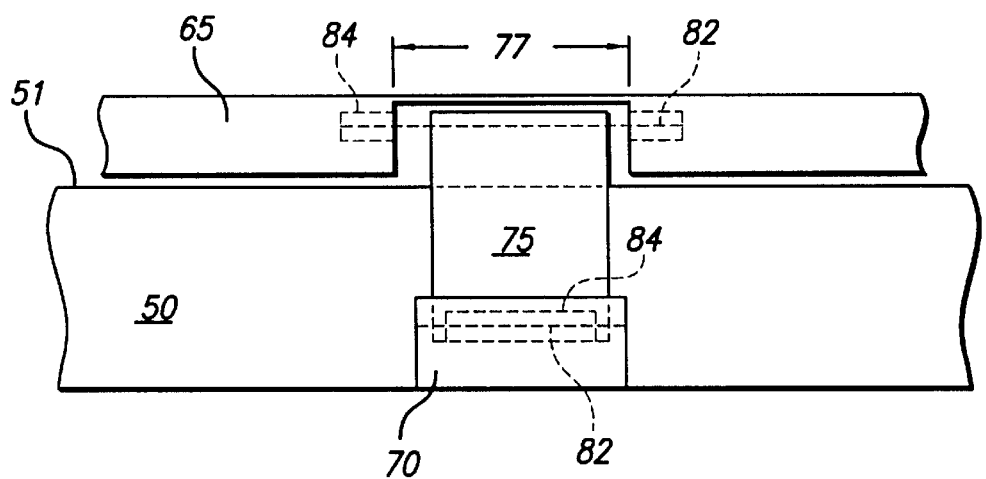
FIG. 7 is a sectional view taken along the line 7—7 in FIG. 5.

Translation arms 75 couple the pivot blocks 70 to the tunnel converter pivots 80. The translation arms 75 extend beneath the tunnel converters 65 when in the stored position between the gooseneck beams 50, shown in phantom in FIGS. 5 and 6. When the tunnel converters 65 are deployed to be positioned atop the gooseneck beams 50, the translation arms 75 extend through translation arm openings 77 in the side of the tunnel converters 65, shown in FIG. 7. This configuration keeps the translation arms 75 from contacting the container 10, thereby avoiding any damage to the container 10 or to the translation arms 75. In this embodiment, the translation arm 75 is coupled to the tunnel converter 65 by a pin 82 and a tube 84 arrangement. The translation arms 75 can be made of metal, metal alloys, aluminum alloys, plastics or other suitable materials.

Figure 5:
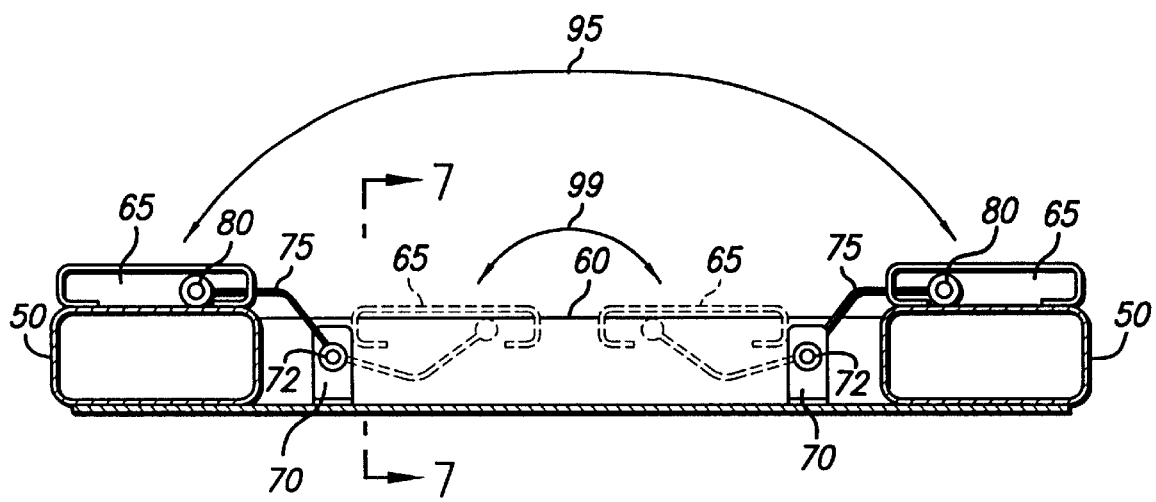
FIG. 5 is a sectional view taken along the line 5—5 in FIG. 3.
Figure 6:
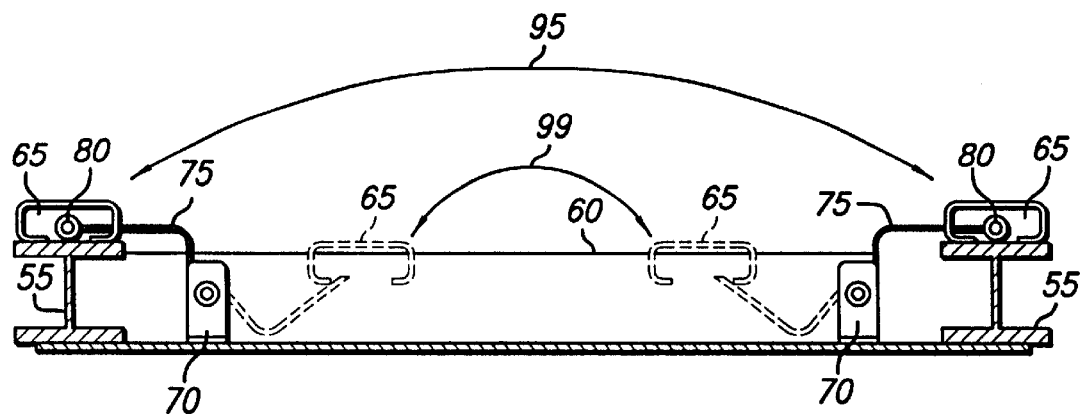
FIG. 6 is a sectional view of an alternative embodiment of the present invention employing I-beam gooseneck frame members.

Illustrated in FIGS. 4–6, cross-brace cutouts 66 in the tunnel converters 65 are aligned with the cross-brace webs 60 so that the tunnel converters 65 can lie substantially between the gooseneck beams 50. Hand-holds 67 located on the tunnel converter 65 upper surface 61 allow the tunnel converters 65 to be hand-operated between the storage position 99 and the deployed position 95 atop the gooseneck beams 50, and vice-versa. Alternatively, the hand holder 67 can be handles that are fastened to the tunnel converters 65.

FIGS. 5 and 6 illustrate conversion of a chassis 5 configured for carrying High-Cube containers to a chassis 5 configured to carry standard containers. When configured to transport a High-Cube container, the gooseneck tunnel converters 65 are positioned in the stored location 99 located substantially between the gooseneck beams 50. In this configuration the variable height gooseneck chassis of the present invention has a gooseneck height 85 of about 3 ¼ inches, when measured from the gooseneck beam upper surface 51 to the rear frame member upper surface 22, shown in FIG. 4. This substantially matches the height of a High-Cube container tunnel 15. The tunnel converter cross-brace cutouts 66 fit over the cross-brace vertical webs 60, permitting the tunnel converters 65 to fit between the gooseneck beams 50. In this position the gooseneck tunnel converters 65 do not interfere with the loading of a High-Cube container on the variable height chassis 5.

When configured for a standard container 10 having a 4 ¾ inch high tunnel 15, the gooseneck tunnel converters 65 are shifted from the storage position 99 to a deployed position 95 atop the gooseneck beams upper surface 51. This operation may be performed manually by an operator or other individual. The operator engages the tunnel converters 65 using the hand-hold openings 67 and translates or shifts the tunnel converters 65 to a position resting on the gooseneck beam upper surface 51. During the translation process the tunnel converters 65 engage in a substantially non-rotational displacement from the storage position 99 to the deployed position 95. This translation movement occurs because each gooseneck tunnel converter 65 pivots simultaneously about the tunnel converter pivots 80 and the gooseneck pivot blocks 70. This substantially non-rotational displacement permits operation of the tunnel converters 75 in an uncomplicated and safe manner, minimizing any risk of operator injury. Although the described example is manually operated, it will be appreciated that automatically controlled hydraulic, pneumatic, gear driven or other suitable systems may be used to automate the deployment and storage of the tunnel converters 65.

When the tunnel converters 65 are positioned adjacent to the gooseneck beam upper surface 51 the variable height gooseneck chassis of the present invention has a gooseneck height 90 of about 4 ¾ inches, when measured from the gooseneck beam upper surface 51 to the rear frame member upper surface 22. This substantially matches the height of a standard container tunnel 15. Moreover, the tunnel converters 65 of the present invention extend substantially from the front bolster 45 to the rear chassis frame member 21, providing full-length gooseneck beam 50 support for the tunnel floor 17 of the container tunnel 15.

As shown in FIG. 6, operation of the tunnel converters 65 of the present invention is identical for chassis 5 constructed with I-beam type gooseneck beams 55. The tunnel converters are stored substantially between the gooseneck beams 55 when transporting High-Cube containers, and deployed atop the gooseneck beams 55 for supporting the tunnel floor 17 of tunnel 15 of standard containers. Translation or shifting from the stored position to the deployed position, and vice-versa, is accomplished as described above, with the operator using the hand-hold openings 67 or other operating handles.

One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A convertible chassis comprising;

a frame member;

a moveable conversions beam; and a translations arm coupling the frame member to the conversion beam;

wherein the translation arm is structured to move the conversion beam from a storage position to a deployed position adjacent an upper surface of the frame member;

wherein the translation arm is pivotally coupled to both the frame member and the conversion beam.

2. The chassis of claim 1, wherein the frame members are I-beams.

3. The chassis of claim 1, wherein the frame members are tubular.

4. The chassis of claim 1, wherein the conversion beam extends from a front bolster to a rear chassis member.

5. The chassis of claim 1, wherein the conversion beam includes hand holes enabling hand operation when shifting the conversion beam from the storage position to the deployed position and vice-versa.

6. The chassis of claim 1, wherein the conversion beam includes cross-brace apertures.

7. The chassis of claim 1, wherein the translation arm is pivotally coupled to the chassis by pivot blocks.

8. The chassis of claim 1, further including at least one pivot element coupled to the translation arm, the pivot element selected from the group consisting of: pin and tube hinges; bearings; and bushings.

9. A convertible chassis for transporting shipping containers comprising: at least two spaced-apart frame members, each frame member including an upper surface:

at least two conversion members; and at least two translation members pivotally coupled to the conversion members and the chassis, and configured to shift the conversion members from a storage position intermediate the frame members to a deployed position proximate to the upper surface of the frame members.

10. The convertible chassis of claim 9, wherein the frame members are I-beams.

11. The convertible chassis of claim 9, wherein the frame members are tubular.

12. The convertible chassis of claim 9, wherein the conversion members extend from a front bolster to a rear chassis member.

13. The convertible chassis of claim 9, wherein the conversion members include hand holes enabling hand operation when shifting the conversion members from the storage position to the deployed position and vice-versa.

14. The convertible chassis of claim 9, wherein the conversion members include cross-brace apertures.

15. The convertible chassis of claim 9, wherein the translation members are pivotally coupled to the chassis on pivot blocks.

16. A convertible chassis for transporting a shipping container comprising:

at least two substantially parallel frame members, each frame member including an upper surface;

at least two conversion members; and at least two pivot arms pivotally coupled to the conversion members and to the chassis and configured to translate the conversion members from a storage position between the frame to a deployed position next to the upper surface of the frame members.

17. The convertible chassis of claim 16, wherein the shipping container rests upon the upper surface of the frame member.

18. The convertible chassis of claim 16, wherein the frame members are I-beams.

19. The convertible chassis of claim 16, wherein the frame members are tubular.

20. The convertible chassis of claim 16, wherein the conversion members extend from a front bolster to a rear chassis member.

21. The convertible chassis of claim 16, wherein the conversion members include hand holes enabling hand operation when shifting the conversion members from the storage position to the deployed position and vice-versa.

22. The convertible chassis of claim 16 wherein the shipping container rests upon the conversion members when the conversion members are in the deployed position.

23. The convertible chassis of claim 16, wherein the translation members are pivotally coupled to the chassis on pivot blocks.

24. The convertible chassis of claim 16, further including at least two pivot elements coupled to the pivot arms, the pivot elements selected from the group consisting of: pin and tube hinges; bearings; and bushings.

25. A method for converting a chassis to support containers of different configurations, the method comprising the steps of:

providing a chassis comprising two chassis beam members;

pivotally mounting a translation arm to the chassis;

pivotally mounting a conversion member to the translation arm; and translating the conversion member from a stored position located substantially between the chassis beam members to a deployed position adjacent an upper surface of the chassis beam member.

* * * * *

UNITED STATES PATENT AND TRADEMARK OFFICE
CERTIFICATE OF CORRECTION

PATENT NO.   : 6,478,324 B1
DATED        : November 12, 2002
INVENTOR(S)  : Howard J. Yurgevich It is certified that error appears in the above-identified patent and that said Letters Patent is hereby corrected as shown below:

Column 5,
Line 29, please delete "conversions" and replace with -- conversion --; and
Line 30, please delete "translations" and replace with -- translation --.

Signed and Sealed this

Eighth Day of July, 2003

JAMES E. ROGAN
*Director of the United States Patent and Trademark Office*